(12) United States Patent
Koteles et al.

(10) Patent No.: US 6,339,662 B1
(45) Date of Patent: Jan. 15, 2002

(54) WAVELENGTH STABILIZED PLANAR WAVEGUIDE OPTICAL DEVICES INCORPORATING A DISPERSIVE ELEMENT

(75) Inventors: Emil S. Koteles; Jian-Jun He, both of Ottawa; Lynden E Erickson, Cumberland; Boris Lamontagne, Ottawa; André Delâge, Gloucester, all of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/363,690

(22) Filed: Jul. 30, 1999

Related U.S. Application Data
(60) Provisional application No. 60/094,712, filed on Jul. 30, 1998.

(51) Int. Cl.[7] ................................................. G02B 6/34
(52) U.S. Cl. ........................... 385/24; 385/37; 385/132; 359/130
(58) Field of Search .............................. 385/24, 37, 12, 385/13, 129, 131, 132; 359/124, 127, 130, 132, 341; 372/50, 102

(56) References Cited

U.S. PATENT DOCUMENTS

| | | | |
|---|---|---|---|
| 5,351,262 A | * | 9/1994 | Poguntke et al. ........... 372/102 |
| 5,371,813 A | * | 12/1994 | Artigue ........................ 385/24 |
| 6,011,884 A | * | 1/2000 | Dueck et al. .................. 385/24 |
| 6,169,838 B1 | * | 1/2001 | He et al. ...................... 385/129 |

OTHER PUBLICATIONS

J.B.D. Soole et al. "Monolithic InP/InGaAsP/InP granting spectrometer for the 1.48–1.56 μm wavelength ramge" Appl. Phys. Lett. vol. 58, No. 18, May 6, 1991, pp. 1949–1951.

F. Tong, et al., "A Wavelength–Matching Scheme for Multiwavelength Optical Links and Networks Using Grating Demultiplexers", IEEE Photonics Technology Letters, vol. 7, No. 6, Jun. 1995, pp 668–690.

* cited by examiner

*Primary Examiner*—Hemang Sanghavi
(74) *Attorney, Agent, or Firm*—Marks & Clerk

(57) ABSTRACT

A planar waveguide optical device whose wavelengths are stabilized by temperature, has an input channel, a series of output data channels, and a dispersive element, such as a diffraction grating or phase array, for directing component wavelengths of incoming light into the respective output data channels. A pair of monitor channels have a separation less than, and a width greater than, the data channels. A differential feedback arrangement controls the temperature of the demultiplexer according a differential signal received from the pair of monitor channels.

18 Claims, 2 Drawing Sheets

WAVELENGTH STABILIZED PLANAR WAVEGUIDE OPTICAL DEVICES INCORPORATING A DISPERSIVE ELEMENT

CROSS REFERENCE TO RELATED APPLICATIONS

This application claims priority under 35 USC 119(e) from U.S. Provisional Application no. 60/094,712 filed Jul. 30, 1998.

FIELD OF THE INVENTION

This invention relates to optical (de)multiplexing, and in particular to wavelength stabilized planar waveguide multiplexers and demultiplexers and optical components incorporating these devices.

BACKGROUND OF THE INVENTION

Integrated wavelength demultiplexers (either phased waveguide arrays or grating-on-a-chip spectrometers) are important components for wavelength division multiplexing (WDM) optical communication systems. Integration offers the advantages of compactness, reliability, and reduced packaging costs. Further, implementation in a semiconductor material, particularly the InGaAsP/InP system, which is important for optical fiber communications systems, permits the monolithic integration of these passive devices with active ones, such as lasers, modulators, optical switches, and detectors, resulting in sophisticated wavelength sensitive photonic integrated circuits with complex functionalities. A grating demultiplexer is described in *Appl. Phys. Lett.* 58, 1949 (1991), J. B. D. Soole et al., "Monolithic InP/InGaAsP/InP grating spectrometer for the 1.48–1.56 $\mu$m range".

One of the major issues in integrated wavelength demultiplexers (DEMUX) is control of the absolute wavelengths of the various channels. The relative accuracy of the channels (that is, the spacing in wavelength or frequency between adjacent channels) can be accurately determined by the geometrical design of the demultiplexer and the optical properties of the waveguide. The geometrical design can be laid out with high precision using modem e-beam technology to write photolithographic masks and waveguide material uniformity over demultiplexer dimensions is adequate to ensure precise channel spacing. Provided at least one channel of the demultiplexer array is set at the correct wavelength, all of the other channels are automatically at their correct wavelengths. This is one of the main advantages of integrated demultiplexers over hybrid demultiplexers which combine many individual elements (Bragg fiber filters or interference filters, for example) in a complex hybrid package. Each element of such a hybrid demultiplexer must be fabricated individually to very tight tolerances so that absolute wavelengths arc maintained and channel spacings are accurate.

Integrated demultiplexers are generally tunable by temperature since waveguide optical properties, such as effective index, are temperature sensitive. This behaviour provides flexibility in that channel wavelengths can be adjusted by temperature control, but at the same time, uncertainty increases since the absolute wavelength of a given channel is temperature sensitive. What is required is a means to ensure that the wavelength setting for each channel is accurate, to within the tolerances set by the International Telecommunications Union (ITU) WDM grid.

At present, the most straightforward means available for establishing the accuracy of integrated demultiplexers is to calibrate each device at the factory. This is accomplished by coupling a laser of known wavelength (in the ITU grid) into the device and then adjusting the device temperature to maximize the optical signal exiting the appropriate channel. This temperature must be maintained during operation to ensure that the device remains calibrated.

Another technique requires the use of a feedback circuit to tune the DEMUX with temperature. By monitoring the intensity of a signal of known wavelength in a channel set aside as a monitor, it is possible, in principle, to lock onto that wavelength and thereby tune all of the channels of the whole DEMUX to their proper wavelengths. This requires that a special wavelength, with an accurately known wavelength, be present in the system at all times. This could also function for example, as an optical supervisory channel (OSC).

The method of calibrating an integrated demultiplexer, at the factory, and, then maintaining that wavelength accuracy in the field, as outlined above, has serious limitations. If the ambient temperature of die device changes, the cooling or heating necessary to maintain calibration will change in an unknown manner. Furthermore, aging effects, either in the waveguide material itself or in components of the packaged device (e.g., the glue or epoxy used to hold the demultiplexer onto the temperature maintaining clement) may change the optimum cooling or heating conditions. The temperature controller itself may undergo changes as it ages, thus altering the device temperature (and wavelength calibration) in an unknown fashion.

The technique of using a feedback mechanism is potentially more promising. However, if there are a large number of wavelengths present in the system (so-called dense WDM), the monitor channel will need to be very narrow (much less than the channel passband), and if the signal starts to drift off the correct position (e.g., by changes in the ambient temperature) or if the signal intensity varies due to changes in the network or aging, the feedback circuit finds it difficult to adjust quickly or accurately. A constant dithering would probably be required to maintain lock-on. Furthermore, if the signal were lost altogether, the circuit would have no way of knowing in which direction to look for the signal, increased or decreased temperature . While seeking to recover the signal, all of the wavelengths in the array would be out of specifications. Further, the narrow passband required for high-density WDM would make it difficult to lock onto the signal easily.

One attempt to overcome this problem is described in the paper entitled "A Wavelength Matching Scheme for Multiwavelength Optical Links and Networks using Grating Demultiplexers", Photonics Technology Letters Vol. 7, No. 6, June 1995, F. Tong et al.

In a conventional grating demultiplexer, incoming light confined in a planar waveguide is diffracted off an echelon grating and focussed onto regions forming waveguide channels in the planar waveguide below ridges formed on the surface of the device. Typically, the ridges should be far enough apart to avoid overlap between the channels, which would cause crosstalk. In the technique described in the Tong article, the separation between two of the output channels is reduced and a reference wavelength is focussed on to a region between two adjacent channels so as to partially overlap them both. This signal is picked up by both channels, and as drift occurs the proportion of the signals received by the respective channels changes. Typically the channels are 4 Å apart. The problem with the Tong proposal is that the device can easily drift by 8 to 12 Å or more, which can result in total loss of signal, in which case the Tong proposal offers no improvement over a simple feedback arrangement. Tong does not have the ability to follow deviations exceeding a very narrow range and possibly for this reason appears not to have been put into practical use.

An object of the invention is to alleviate the aforementioned problems of the prior art.

SUMMARY OF THE INVENTION

According to a first aspect of the present invention there is provided a wavelength stabilized planar waveguide optical device comprising an input channel, a plurality of output data channels, and a dispersive element for directing component wavelengths of incoming light into said respective output channels, a pair of monitor channels for receiving a reference wavelength having a separation less than, and a width greater than, said data channels, and a differential feedback arrangement for controlling the temperature of the demultiplexer according a differential signal received from said pair of monitor channels to stabilize the wavelengths of the device.

The separation refers to the distance between the edges of the channels, and in the preferred embodiment can actually be zero; i.e. the channels touch at their inputs.

Only one pair of monitor channels is required, although additional monitor channels forming additional differential pairs could be provided if desired. The monitor channels are preferably in contact at their inputs, and a control wavelength, possibly also providing a supervisory channel, is directed to a point where it overlaps the monitor channels equally when the device is locked to the control wavelength. In a preferred arrangement, the monitor channels taper outwardly in width toward their inputs, where they are in contact with each other, and the monitor wavelength is directed by the dispersive element so as to extend equally on either side of the line of contact between the two channels.

By widening the monitor channels relative to the data channels, it is possible to maintain a lock on the signal even when the device drifts by as much as 8 to 12 Å.

A similar result can be achieved by defocussing the reference beam at the inputs to the monitor channels. Accordingly, a second aspect of the invention provides a wavelength stabilized planar waveguide optical device comprising an input channel, a plurality of output data channels, and a dispersive element for directing component wavelengths of incoming light into said respective output channels, a pair of monitor channels for receiving a reference wavelength, said monitor channels having inputs positioned relative to said dispersive element such that said reference wavelength is defocussed at the inputs to said monitor channels to increase its spot size, and a differential feedback arrangement for controlling the temperature of the demultiplexer according a differential signal received from said pair of monitor channels to stabilize the wavelengths of the device.

The monitor channels are conveniently separated from the data channels so as to avoid taking up data bandwidth.

Normally, the demultiplexed wavelengths are tightly focussed on to the output data channels to achieve maximum resolution and minimum crosstalk. The effectiveness of the monitoring device can be further enhanced by defocussing the monitor wavelength so as to broaden the spot in the vicinity of the monitor channels. In this way, because the light is spread over a greater area, the monitor channels are more tolerant of large deviations from normal.

The invention also provides a method of wavelength stabilizing a planar waveguide optical device incorporating a dispersive element comprising the steps of receiving multiplexed light containing a reference wavelength on an input channel; directing component wavelengths of the incoming light into respective data channels and said reference wavelength onto a pair of monitor channels with the aid of said dispersive element, said monitor channels having a separation less than, and a width greater than, said data channels, and controlling the temperature of the demultiplexer with a differential signal received from said pair of monitor channels to stabilize the wavelengths of said device.

The invention is applicable to both phased waveguide arrayed and diffraction grating demultiplexers.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
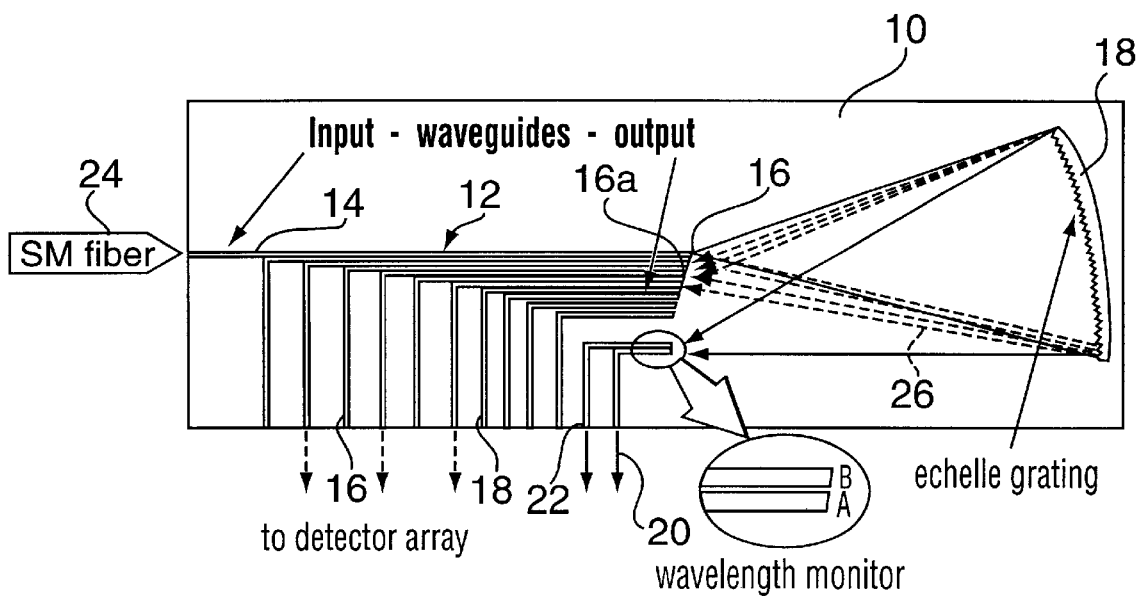
FIG. 1 is a schematic view of a wavelength demultiplexer integrated device incorporating an integrated diffraction grating.

Referring now to FIG. 1, the wavelength demultiplexer based on an integrated diffraction grating consists of an InP/InGaAsP/InP planar waveguide structure 10 with InGaAsP layer forming the planar waveguide and the surrounding InP layer forming the cladding. On the surface of the structure 10 are deposited a series of raised InP ridges 12, which serve to confine the light in the waveguide laterally and define the active waveguide channels of the device.

A multiplexed beam of input light is directed along input channel 14 to its output 16 from where it diverges in the planar waveguide toward echelon grating 18, which in turn, when the device is at the correct temperature, focusses the demultipexed wavelengths onto the output data channels 18. Typically the data channels are 13 $\mu$m wide with a 7 $\mu$m separation.

In accordance with the principles of the invention, a pair of monitor channels 20, 22 are located apart from the data channels 18. The distance from the array of data channels 18 is about 40 $\mu$m. The channels 20, 22 are tapered at the end by increasing their width until they touch, in the specific example by 3.5 $\mu$m on each side at their ends.

In operation, the incoming optical signals of different wavelengths are coupled from an optical fiber 24 to the input waveguide of the demultiplexer 10. At the end of the input waveguide the light diverges into the slab waveguide 26 and is then focused back to the inputs 16a of the output channels 16 by the curve of the echelle grating 18. Due to the dispersive property of the diffraction grating, light signals of different wavelengths are focused onto different output waveguides.

The incoming multiplexed light includes an accurately known wavelength, $\lambda_m$, which must be present in the optical multiwavelength network. This can also double as an optical supervisory channel. This wavelength is directed by the grating 18 onto the split multimode, output channels 20, 22. The monitor wavelength is slightly defocussed at the input to the channels 20, 22 to broaden the spot size and thus spread the beam over a greater area. Defocussing can be achieved by slightly offsetting the ends of channels 20, 22 relative to the focal point of the grating 18. Typically, the displacement of the input channels from the focal point of the grating might be in the order of 50 µm to achieve a defocussed spot size of about 50 µm.

The position of this monitor channel is determined precisely by the relationship between $\lambda_m$, and the wavelengths of the regular output waveguide array 12, located above it in this case. When the temperature of the DEMUX chip is adjusted so that the signal intensity in channel A is equal to that in channel B, $\lambda_m$, is exactly incident in the middle of the split monitor channels, and all of the output channels are automatically and precisely lined up with their correct wavelengths. The monitor spot in this cases bridges equally the line of contact between the two channels 20, 22.

The temperature of the device, and thus the wavelengths of the demultiplexed channels, is thus controlled by the differential signal from the two monitor channels 20, 22.

Figure 2:
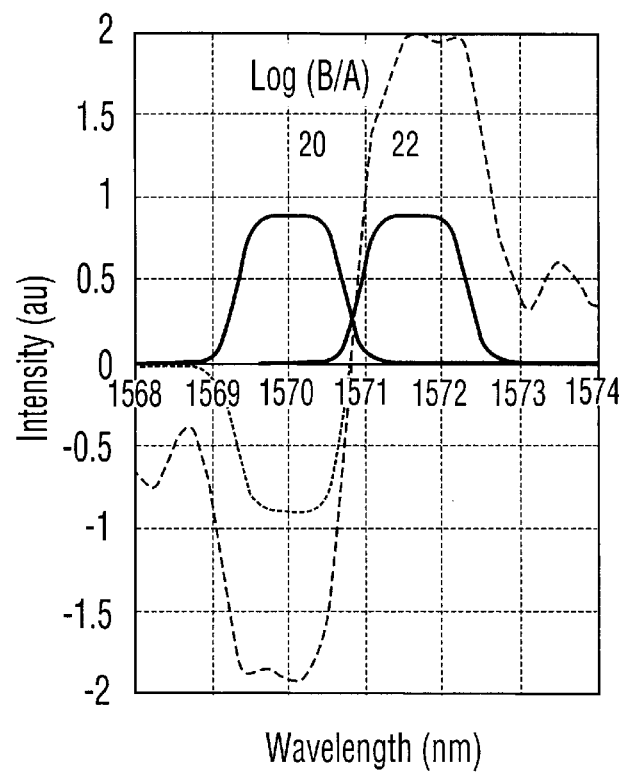
FIG. 2 is a simulation illustrating the operation of the device.

FIG. 2 is a simulation illustrating the operation of the wavelength stabilizer. In this case, the simulation models the signal intensity in each split monitor waveguide (20 and 22) as the wavelength is scanned. (With a change in sign, this is identically equivalent to keeping the wavelength fixed and scanning the response of the DEMUX by temperature tuning. As the wavelength is increased, first channel 20 collects the light and then channel 22. Due to the finite size of the focused spot, approximately equal to the mode size of the input waveguide (about 3 µm in this case), there will be some overlap of these channel functions. When $\lambda_m$, is exactly incident an the middle of the split monitor channels 20, 22, the channels will have identical signal strengths. If the difference between these two signals is calculated, the dotted curve results. It has the unique property of being negative on one side of the overlap region and positive on the other. Thus, by monitoring the sign of the difference of these two signals, the direction of a correction signal is readily apparent. Alternatively, it is possible to monitor the difference of the logarithms of these values, equivalent to the log of the ratio-dashed curve, which is less sensitive to signal intensity fluctuations.

For example, if, in FIG. 2, the difference is found to be negative, then the wavelength will need to be increased; if positive, it will need to be decreased to reach the equilibrium position at which the difference is zero. Similarly, if the wavelength is fixed and the chip calibration begins to drift for any reason (change in ambient temperature, some problem with the thermoelectric cooler, etc.), the sign of the difference will indicate the direction of the correction. In practice, the feedback circuit is designed to keep the difference at zero, the region of maximum sensitivity (steepest slope). Thus, even minor drifts away from calibration will be immediately and accurately corrected, with little or no overshoot or hunting.

Figure 3:
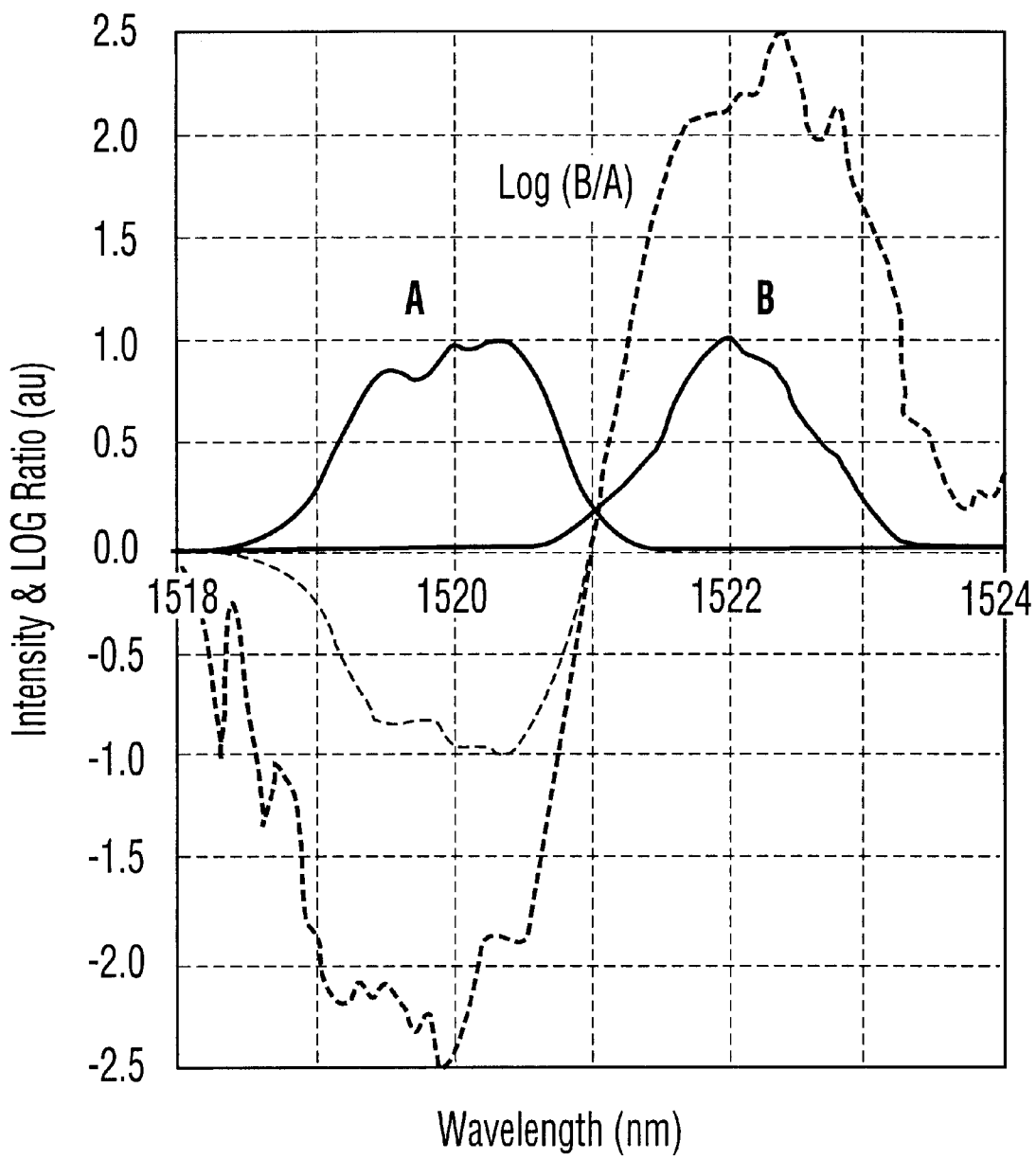
FIG. 3 is an actual experimental version of the simulation shown in FIG. 2.

FIG. 3 is an experimental version of the operation of the differential monitor which can be compared with the simulation shown in FIG. 2. The results were obtained from an InP-based DEMUX chip which incorporated a non-optimized version of the split output waveguide monitor channels shown schematically in FIG. 1. The channel width was 13 µm and the data channel separation 7 µm. The spot size of the monitor wavelength was approximately equal to the mode size of the input waveguide 24, about 3 µm in this case. The signal intensities of channels 20 and 22 were found not to be equal and thus were normalized for this analysis. Optimizing the split channel design so as to ensure that each channel collects the same signal intensity is a trivial exercise. Even so, in practice, if necessary, channel signal equalization can be accomplished by adjusting the gain for the photodetector in each channel. Although these experimental results are not ideal, the response of the split output monitor waveguides is identical to the simulation in FIG. 2.

The present invention permits the fabrication of a monolithically integrated device with a dispersive element, so that both are fabricated simultaneously and are automatically aligned and kept aligned. By widening the channels, and/or defocussing the spot, the operating range over which the wavelength can be locked can be increased, in principle, indefinitely. This relaxes tolerances on fabrication and initial start-up conditions, which rendered the prior art technique impractical.

Also the concept of utilizing the stabilization of a single monitor wavelength to simultaneously lock the wavelengths of an array of wavelength sensitive detectors magnifies the utility of the technique and reduces stabilization costs, per wavelength, significantly. Furthermore, it will be apparent to one skilled in that art that this concept for wavelength stabilization can be readily adapted to arrayed waveguide (de)multiplexers (phasars) and any other integrated dispersive element in any material system.

We claim:

1. A wavelength stabilized planar waveguide optical device comprising an input channel, a plurality of output data channels, and a dispersive element for directing component wavelengths of incoming light into said respective output channels, a pair of monitor channels for receiving a reference wavelength having a separation less than, and a width greater than, said data channels, and a differential feedback arrangement for controlling the temperature of the optical device according a differential signal received from said pair of monitor channels to stabilize the wavelengths of the device.

2. An optical device as claimed in claim 1, wherein the monitor channels are in contact at their inputs, and the dispersive element is configured such that a reference wavelength is directed to a point where it overlaps the monitor channels equally when the device is locked to the reference wavelength.

3. An optical device as claimed in claim 2, wherein the monitor channels are tapered outwardly toward their inputs, where they are in contact.

4. An optical device as claimed in claim 3, wherein the pair of monitor channels is located apart from the data channels so as to avoid taking up data bandwidth.

5. An optical device as claimed in claim 1, wherein the dispersive element is a diffraction grating.

6. An optical device as claimed in claim 1, wherein the dispersive element is a phased array.

7. An optical as claimed in claim 1, wherein said optical device is formed as a monolithic integrated device.

8. A wavelength stabilized planar waveguide optical device comprising an input channel, a plurality of output data channels, and a dispersive element for directing component wavelengths of incoming light into said respective output channels, a pair of monitor channels for receiving a reference wavelength, said monitor channels having inputs positioned relative to said dispersive element such that said reference wavelength is defocussed at the inputs to said monitor channels to increase its spot size, and a differential feedback arrangement for controlling the temperature of the optical device according a differential signal received from said pair of monitor channels to stabilize the wavelengths of the device.

9. An optical device as claimed in claim 8, wherein the monitor channels are in contact at their inputs, and the dispersive element is configured such that a reference wavelength is directed to a point where it overlaps the monitor channels equally when the device is locked to the reference wavelength.

10. An optical device as claimed in claim 9, wherein the monitor channels are tapered outwardly toward their inputs, where they are in contact.

11. A method of wavelength stabilizing a planar waveguide optical device incorporating a dispersive element comprising the steps of:

receiving multiplexed light containing a reference wavelength on an input channel;

directing component wavelengths of the incoming light into respective data channels and said reference wavelength onto a pair of monitor channels with the aid of said dispersive element, said monitor channels having a separation less than, and a width greater than, said data channels, and controlling the temperature of the optical device with a differential signal received from said pair of monitor channels to stabilize the wavelengths of said device.

12. A method as claimed claim 11, wherein the monitor channels are in contact at their inputs, and the spot size of the reference wavelength is such that it overlaps the monitor channels equally when the device is locked to the reference wavelength.

13. A method as claimed in claim 12, wherein the monitor channels are tapered outwardly toward their inputs, where they are in contact.

14. A method as claimed in claim 11, wherein the dispersive element is a diffraction grating.

15. A method as claimed in claim 11, wherein the dispersive element is a phased array.

16. A method of wavelength stabilizing a planar waveguide optical device incorporating a dispersive element comprising the steps of:

receiving multiplexed light containing a reference wavelength on an input channel;

directing component wavelengths of the incoming light into respective data channels and said reference wavelength onto a pair of monitor channels with the aid of said dispersive element, said monitor channels being positioned relative to said dispersive element such that said reference wavelength is defocussed at the inputs to the monitor channels to increase its spot size, and controlling the temperature of the optical device with a differential signal received from said pair of monitor channels to stabilize the wavelengths of said device.

17. A method as claimed claim 16, wherein the monitor channels are in contact at their inputs, and the spot size of the reference wavelength is such that it overlaps the monitor channels equally when the device is locked to the reference wavelength.

18. A method as claimed in claim 17, wherein the monitor channels are tapered outwardly toward their inputs, where they are in contact.

* * * * *